United States Patent [19]
Lytell

[11] Patent Number: 5,617,798
[45] Date of Patent: Apr. 8, 1997

[54] ALL-PURPOSE ADJUSTABLE REUSABLE CAKE SUPPORT

[76] Inventor: April J. Lytell, 6518 E. Jupiter Ave., Scottsdale, Ariz. 85254

[21] Appl. No.: 523,182

[22] Filed: Sep. 5, 1995

[51] Int. Cl.⁶ ............................................. A47B 9/00
[52] U.S. Cl. ................. 108/144; 248/407; 108/96
[58] Field of Search .................... 108/96, 95, 92, 108/91, 144; 248/423, 188.5, 407

[56] References Cited

U.S. PATENT DOCUMENTS

| | | | |
|---|---|---|---|
| 671,395 | 4/1901 | Hayward | 248/407 |
| 1,838,352 | 12/1931 | Anderson | 108/144 X |
| 2,010,290 | 8/1935 | Campbell | 108/144 X |
| 2,178,166 | 10/1939 | Enstrom | 248/163 |
| 2,605,987 | 8/1952 | Brown et al. | 108/144 X |
| 2,748,261 | 5/1956 | Wolar | 248/407 X |
| 2,921,691 | 1/1960 | Dembinski | 211/134 |
| 3,070,236 | 12/1962 | Macpherson | 211/137 |
| 3,690,610 | 9/1972 | Peirie | 248/159 |
| 3,814,032 | 6/1974 | McMains | 108/101 |
| 4,069,772 | 1/1978 | Haadala | 108/94 |
| 4,101,232 | 7/1978 | Haapala | 403/261 |
| 5,165,637 | 11/1992 | Polley | 248/188.4 |

FOREIGN PATENT DOCUMENTS

| | | | |
|---|---|---|---|
| 1187395 | 9/1959 | France | 108/144 |
| 820794 | 9/1951 | Germany | 108/144 |

*Primary Examiner*—Jose V. Chen
*Attorney, Agent, or Firm*—Parsons & Goltry; Robert A. Parsons; Michael W. Goltry

[57] ABSTRACT

An all-purpose reusable adjustable cake support capable of being easily and thoroughly cleaned. A shaft is inserted into a mated hollow tube to form an adjustable pole. The shaft has perpendicular fins in spaced relation along the length of the shaft. The fins form a series of parallel slots running transversely to the lengthwise axis of the shaft. Each fin has a groove such that the aligned grooves form a channel that runs the length of the shaft. A knob-like projection integral with the tube extends into the interior of the tube. The shaft is inserted into the tube to the desired depth by aligning the channel with the knob-like projection. To lock the shaft in place at a desired pole length, the shaft is rotated so that the groove and projection are misaligned, such that the fins catch on the projection.

12 Claims, 3 Drawing Sheets

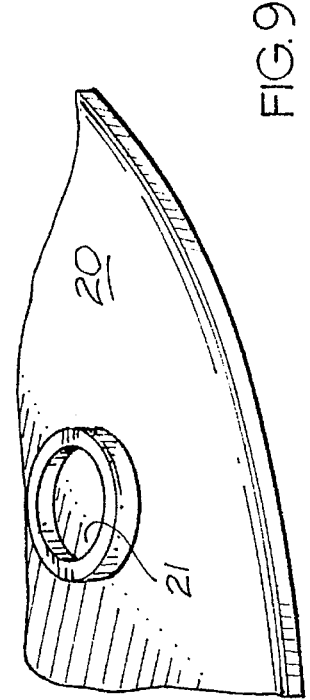
FIG. 8
FIG. 9
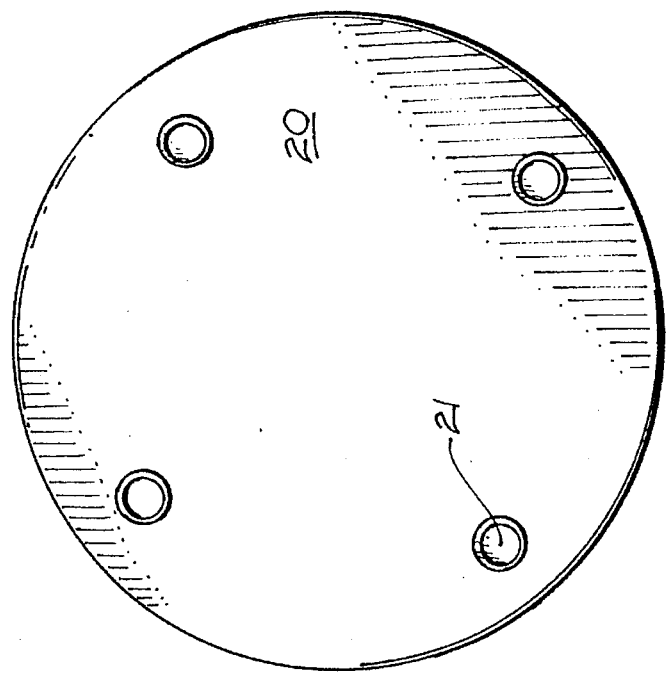
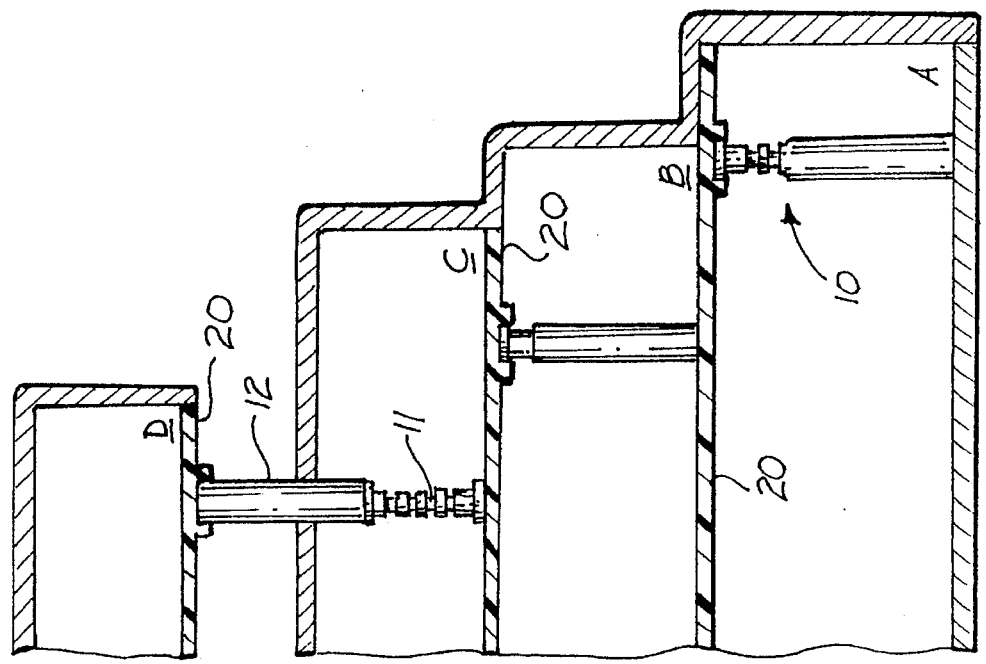
FIG. 1

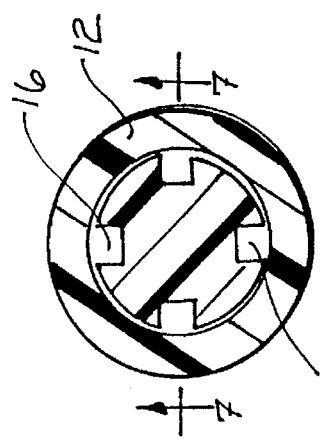
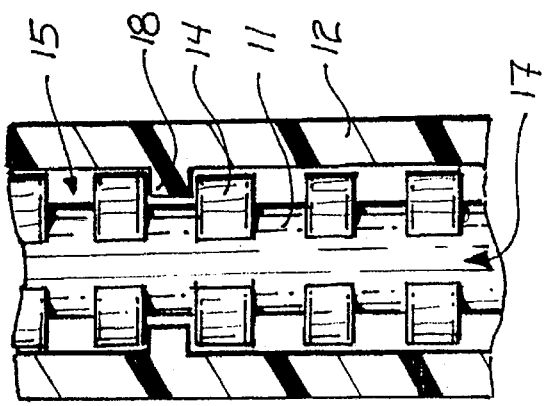
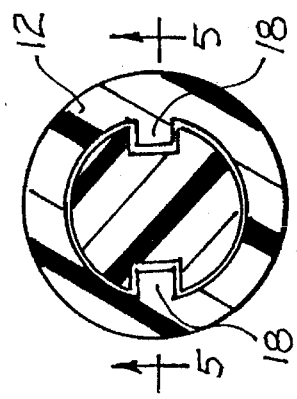
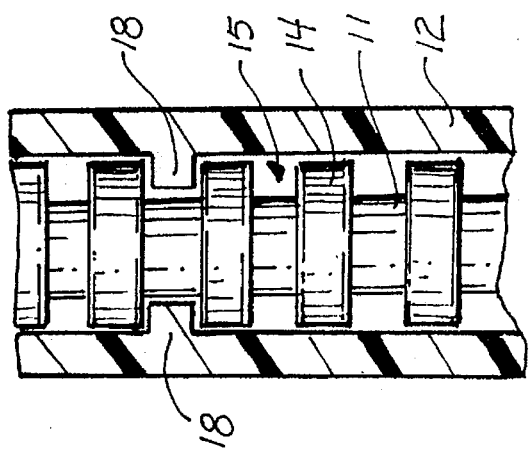
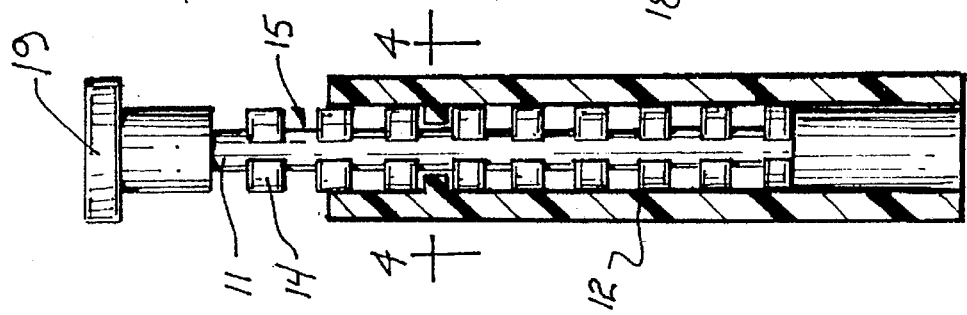
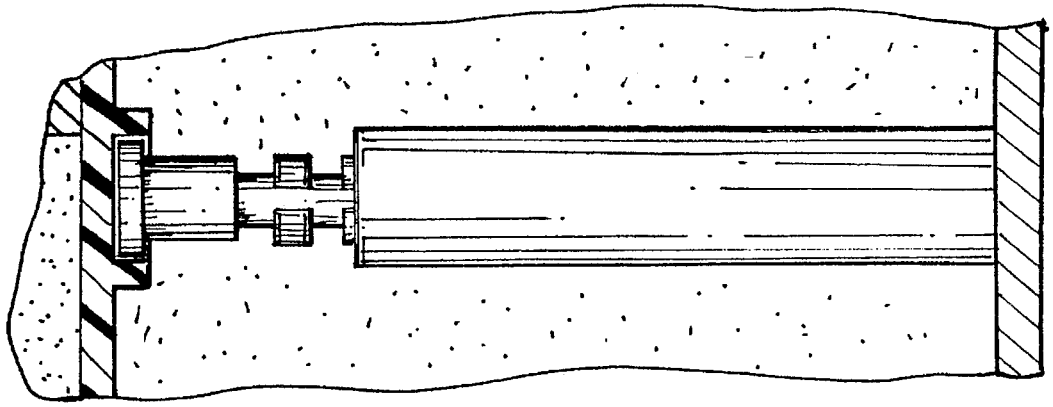

ALL-PURPOSE ADJUSTABLE REUSABLE CAKE SUPPORT

BACKGROUND OF THE INVENTION

This invention relates generally to a cake support, and more particularly to an incrementally-adjustable and reusable cake support for multi-layer cakes. It is an all-purpose device used to support layers, tiers, or objects on top of a cake layer.

Professional pastry chefs use cake supports for many purposes when building multi-layer cakes. The cake supports are used to compensate for thickness variations of a given cake layer and to insure that the layers are level. The cake supports also prevent heavy upper layers from deforming the lower layers. Cake top decorations, such as a bride and groom sculpture, can be placed atop cake supports to professionally finish the cake. Several types of cake supports are commonly used today to achieve the various effects, including the wood dowel and plastic Roman pillar. These cake supports may be used separately or in combination to build various cake structures.

For a stacked cake, wood dowels are first sawed into pieces as long as the layer is tall and are then inserted directly into the cake layer. A cardboard shelf or other support plate is then placed on top of the cake layer to support the next cake layer. This cardboard shelf is thus supported by at least four dowels in the cake. To build a stack, the next layer of cake placed directly on the cardboard shelf covering the lower layer. The dowels and cardboard structure is repeated for each additional layer.

For a tiered cake, the wood dowels are again cut and then inserted into the cake. A plastic plate or other support plate is placed on top of the layer, followed by plastic pillars to separate the layers and form a tier. The support plate may balance on the pillars, or the pillars may be fitted into integral cups molded into the plastic plate. The dowels, plate, and pillar structure is repeated for each additional layer.

Cutting the dowels to the correct length is dirty process, and the sawdust is difficult to contain and clean up. The dowels are also relatively difficult to cut to the proper length and at a proper 90 degrees to the lengthwise axis. The biggest drawback, however, it that wood dowels cannot be reused because wood is difficult to sanitize and because the dowels are "custom" lengths.

Several cake supports have been devised to overcome these problems. For example, in U.S. Pat. Nos. 4,069,772 and 4,101,232 Haapala describes a pallet and leg assembly for providing level tiers. The pallet has holes to receive the legs. The legs are composed of a shank having cruciform fins, a head with lugs, and a collar between the head and the shank. To assemble the cake support, the head of the leg is fitted into the pallet hole and rotated, thereby clamping the pallet between the collar and the lugs. The legs are of various lengths to accommodate different cake heights. This device does not provide adjustable-length legs, however, making leveling cake layers quite difficult. Furthermore, the head of the leg extends beyond the pallet so that it is visible between the layers or above the cake. A stacked cake effect cannot be achieved because the heads cause a relatively large space between each layer.

In U.S. Pat. No. 5,165,637 Polley describes an infinitely adjustable cake jack consisting of a threaded shaft that fits in a mated cylindrical sleeve. The shaft is finely threaded. Unfortunately, while the device does allow minute adjustments to be made, the shaft must be rotated repeatedly to advance the shaft in the sleeve any significant distance. A large quick adjustment cannot be made. In addition to being finely threaded, the sleeve does not have a through bore, instead having one closed end. The threads and closed end make the Polley device extremely difficult to thoroughly clean and therefore impractical for reuse. Furthermore, the closed-end bore limits the amount of extension available, because it requires a shorter shaft for a given sleeve length. These devices have not achieved widespread commercial use because of these disadvantages.

Therefore, it is an object of this invention to provide a cake support that is quickly adjustable and can be easily cleaned. It is a further object of this invention to provide a cake support that is sanitary and reusable. Another object is to provide a cake support that provides good stability for added cake layers. A further object is to provide an all-purpose cake support that can be used in place of the variety of known support structures to create multi-layer cakes. Another object of this invention is to provide an easily manufactured cake support. Finally, it is an object of this invention to combine the advantages of reuse and easy manufacture to create an inexpensive cake support.

BRIEF SUMMARY OF THE INVENTION

The present device is a reusable adjustable cake support capable of being easily and thoroughly cleaned. The device is user-friendly because its elegant design allows it to be used in place of the variety of known support structures, and thus the single device may be used for building all types of multi-layer cakes. A shaft is inserted into a mated hollow tube to form an adjustable support. The tube has a through bore and is therefore open at both ends so that water may freely flow through the tube to clean it. A pin-like projection integral with the tube extends into the interior of the tube.

The shaft has fins oriented perpendicularly to the lengthwise axis of the shaft, which form a series of parallel slots running transversely to the lengthwise axis of the shaft. Each fin is spaced sufficiently far from the neighboring fin to again allow the wash water to flow through the slots and thoroughly clean the slots. Each fin has grooves in alignment with the grooves of the neighboring fins resulting in a channel that runs the length of the shaft. The grooves are wide enough to allow the wash water to freely flow through the grooves for easy clean-up.

To adjust the cake support to the desired length, the shaft is inserted into the tube to the desired depth by aligning the shaft channel with the projection inside the tube. To lock the shaft in place at a desired support length, the shaft is rotated so that the groove and projection are misaligned, such that the fins catch on the projection. The space between neighboring fins determines the size of the minimum incremental change allowed in the length of the cake support.

BRIEF DESCRIPTION OF THE DRAWINGS

FIG. 1 is a cross-section of a cake, illustrating the present invention supporting stacked layers and a tiered layer with molded integral cups.

FIG. 2 is a close-up of the present device supporting a stacked layer.

FIG. 3 is a cross-section of the present device in an unlocked condition.

FIG. 4 a cross-section of the present device in an unlocked condition along line 4—4 of FIG. 3.

FIG. 5 is a close-up view of the locking mechanism of the present device along line 5—5 of FIG. 4.

FIG. 6 a cross-section of the present device in a locked condition.

FIG. 7 is a close-up view of the locking mechanism of the present device in a locked condition along line 7—7 of FIG. 6.

FIG. 8 is a bottom view of a support plate having integral cups.

FIG. 9 is a perspective view of an integral cup.

DESCRIPTION OF THE PREFERRED EMBODIMENTS

Figure 11:
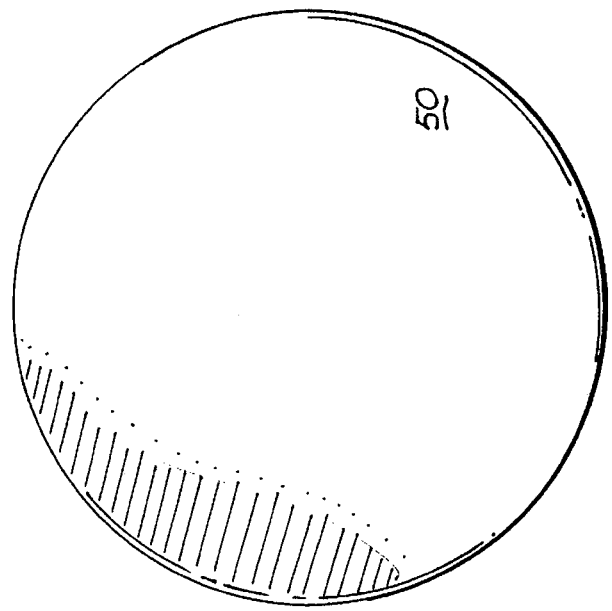
FIG. 11 is a bottom view of a smooth support plate without integral cups.
Figure 10:
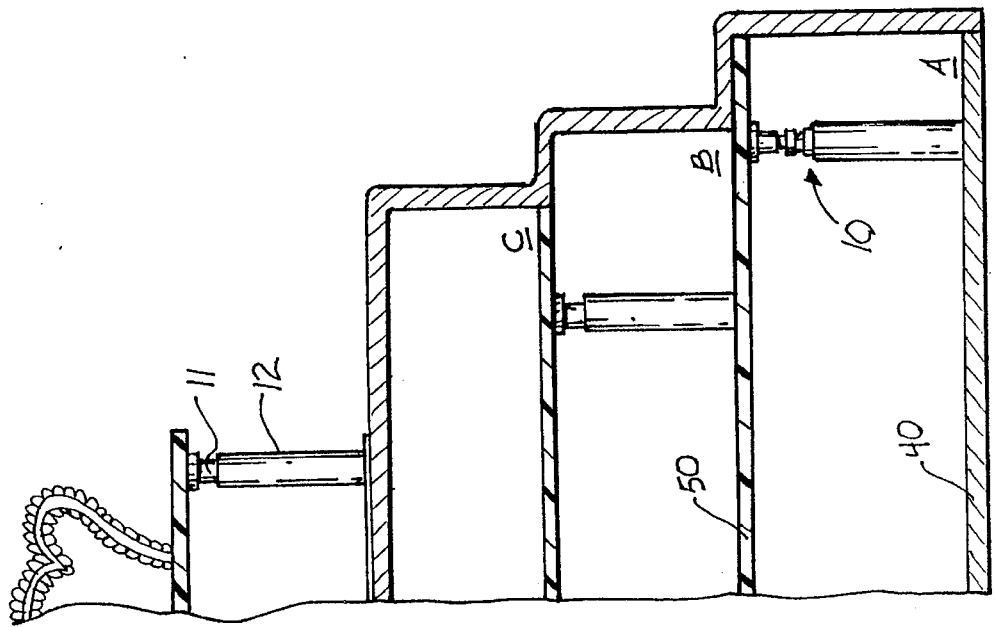
FIG. 10 is a cross-section of a cake, illustrating the present invention supporting stacked layers and a cake top, without molded integral cups.

Refer now to the accompanying FIGS. 1–11 where like numerals represent like parts through out the drawings. The cake support assembly, denoted generally as 10, is shown supporting cake layers in FIGS. 1 and 10. FIG. 1 shows the device supporting stacked cake layers B and C in cooperation with support plates having molded integral cups. FIG. 1 also shows the device in an inverted position supporting a tiered cake layer D. FIG. 10 shows the device supporting a decorative cake top E and cake layers B and C on support plates without molded integral cups. The two-part cake support assembly 10 comprises a shaft 11 and a tube 12.

As best illustrated in FIGS. 3, 5, and 7, the shaft 11 has fins 14 oriented perpendicularly to the lengthwise axis of the shaft 11, which form a series of parallel slots 15 running transversely to the lengthwise axis of the shaft. Each fin 14 is spaced sufficiently far from the neighboring fin to again allow the wash water to flow through the slots and thoroughly clean them. Each fin 14 has at least one groove 16 in alignment with the grooves of the neighboring fins resulting in a channel 17 that runs the length of the shaft 11. The grooves are wide enough to allow the wash water to freely flow through the grooves for easy clean-up.

As indicated in FIG. 3, the tube 12 has a through bore and is therefore open at both ends so that water may freely flow through the tube to clean it. Preferably the shaft 11 is solid, although it may be hollow, as long as both ends are closed to prevent food from being trapped inside the shaft. The shaft 11 and tube 12 are made of materials such as plastic or nylon that are able to withstand the temperatures of a commercial dishwasher so that they may be easily cleaned.

At least one, and preferably two, pin-like projections 18 integral with the tube 12 extend into the interior of the tube. The position of the projection 18 inside the tube 12 determines the amount of extension available because the nearer the projection is to the end of the tube 12, the more the shaft 11 can extend from the tube 12. Preferably the projection 18 is approximately one tube diameter from the end of the tube. This allows considerable extension of the shaft 11, but requires enough of the shaft 11 to remain inside the tube 12 so as to provide a stable connection between the shaft 11 and the tube 12.

A significant advantage of this device is its stability. First, the fins 14 rest on the projections 18 for vertical stability—the device will not collapse into itself. To prevent the device from angularly yielding at the extension point, the fins 14 are long enough to closely fit inside the tube 12. The tolerance between the fin 14 and the tube 12 is wide enough to allow the shaft 11 to easily slide in the tube 12, but narrow enough to provide a point of support as the fins 14 abut the inner tube walls upon even the slightest angling of the shaft 11 with respect to the tube 12.

A cake plate, cardboard support of any desired shape, or other type of plate-like support balances on the head of the device. To better support a cake layer, the shaft 11 may have a head 19 which increases the surface area on which a support plate 20 may rest. Larger heads provide a larger surface area and increased stability. Support plates 40 and 50 having a substantially flat and smooth underside may be used as in FIGS. 10 and 11. Alternatively, a support plate 20 having integral cups 21 with a diameter the same as or only slightly bigger than the head 19 may be used. See FIGS. 8 and 9. Ideally the head 19 fits snugly inside the cup 21 of a conventional support plate 20, as shown in FIGS. 1, 8 and 9. The cooperation of the head and cup provides additional stability.

To employ the present device for supporting stacked layers, the necessary height of the cake support is approximated and the shaft 11 is inserted and locked into the tube 12 at this desired height as shown in FIGS. 6 and 7. The assembled device 10 is then fully inserted into a cake layer until the tube 12 rests on a lower support plate 30, ideally leaving the head 19 resting in a plane with or slightly below the top of the layer. At least four cake supports should be inserted into the layer to achieve sufficient stability. Each cake support is adjusted to the height desired at each location. If necessary, adjustments can be made once the cake support is in place by turning the shaft 11 to an unlocked position, as shown in FIG. 4 and 5, sliding the shaft 11 to the appropriate position, and rotating the shaft 11 back into the locked position. Another support plate 20 is then placed on top of the layer, balancing on and supported by the cake supports. FIG. 1 shows the device in use with cake plates 20 to create stacked layers A,B,C.

FIG. 1 also shows the device in use with support plate 20 to create tiered layer D. For tiered layers, the necessary height of the cake support is determined and the shaft 11 inserted and locked into the tube 12 at this desired height. The assembled device is then fully inserted into the cake in an inverted position, that is head 19 first, leaving the tube 12 extending above the top of the layer. At least four cake supports should be inserted into the layer to achieve sufficient stability. Each cake support is adjusted to the height desired at each location. A plate having integral cups 21 with a diameter the same as or only slightly bigger than the outside tube 12 diameter is then placed on top of the layer, balancing on and supported by the cake supports.

For ease of manufacture and compatibility with conventional cake plates, the outside dimension of the tube should match that of the inside diameter of the molded cups, typically approximately half an inch. Alternatively, different diameters may be used, especially if the cake supports will not be used in conjunction with conventional cake plates. The tube may be of any length, and comparable commercial cake supports are about three inches long when unextended. Also for ease of manufacture and compatibility, the shaft and mated tube are preferably cylindrical, although other shapes are envisioned. For example, the shaft may have irregularly shaped cams as fins. A tube with a rectangular cross section accommodates the cams, allowing the shaft to rotate into and out of a locked position. Alternatively, the tube may instead be a simple rectangular frame having pin-like projections to catch on the fins or cams.

The objects of this invention are achieved through the aforementioned preferred embodiments. In particular, the invention is an easily cleaned, adjustable cake support that is used and reused in conjunction with smooth or mated cake plates to build tiers, stacked layers, and to support decorative cake tops. Although certain preferred embodiments have been shown and described, it should be understood that other embodiments and modifications that achieve these objects may be apparent to those of skill in the art and are within the scope of the appended claims.

I claim:

1. A cake support comprising:
   a) a shaft having a proximate and distal end, the shaft further comprising:
      i) a plurality of fins disposed perpendicularly to the lengthwise axis of the shaft, the fins being in spaced relation along the length of the shaft;
      ii) each pair of adjacent fins define a slot therebetween, perpendicular to the lengthwise axis of the shaft;
      iii) each fin having a groove, the groove of each fin in alignment with those of the other fins thereby forming a channel that runs the length of the shaft; and
   b) a tube having a hollow through bore open at opposing ends and having a diameter to closely receive the fins of the shaft, the tube further comprising:
      i) at least one projection integral with the tube extending into the interior of the tube sized to fit within the slots Such as to contact both the defining fins;
   whereby the cake support is incrementally shortened or lengthened by inserting the shaft into the tube to the desired depth by aligning the channel with the projection, and locking the shaft in place at a desired length by rotating the shaft such that the groove of a desired fin and the projection are misaligned, so that the fins catch on the projection.

2. A cake support of claim 1 wherein the proximate end of the shaft is integral with a head having a larger cross-sectional dimension than the shaft.

3. A cake support of claim 1 wherein the tube has an outside diameter substantially the same as the inside diameter of a molded cup integral with a support plate.

4. A cake support of claim 1 wherein the shaft and tube are made of a material able to withstand the temperature of a commercial dishwasher.

5. A cake support of claim 1 wherein the tube has two projections on opposing sides of the interior of the tube.

6. A cake support of claim 1 wherein the shaft is solid.

7. A cake support system for evenly supporting the tiers of a multi-tier cake, the system comprising:
   a plurality of cake supports each comprising:
   a) a shaft having a proximate and distal end, the shaft further comprising:
      i) a plurality of fins disposed perpendicularly to the lengthwise axis of the shaft, the fins being in spaced relation along the length of the shaft;
      ii) each pair of adjacent fins define a slot therebetween, perpendicular to the lengthwise axis of the shaft; and
      iii) each fin having a groove, the groove of each fin in alignment with those of the other fins thereby forming a channel that runs the length of the shaft;
   b) a tube having a hollow through bore open at opposing ends and having a diameter to closely receive the fins of the shaft, the tube further comprising:
      i) at least one projection integral with the tube extending into the interior of the tube sized to fit within the slots such that it contacts the defining fins;
   whereby the cake support is incrementally shortened or lengthened by inserting the shaft into the tube to the desired depth by aligning the channel with the projection, and locking the shaft in place at a desired length by rotating the shaft such that the groove of a desired fin and the projection are misaligned, so that the fins catch on the projection;
   the projection and slots being substantially identical in each support to permit identical adjustment; and
   a support plate for carrying a tier of a cake, supported by the plurality of cake supports, the support plate supported in a level orientation by identically adjusting each cake support.

8. A cake support system of claim 7 wherein the proximate end of the shaft of each cake support is integral with a head having a larger cross-sectional dimension than the shaft.

9. A cake support system of claim 7 wherein the tube has an outside diameter substantially the same as the inside diameter of a molded cup integral with the support plate.

10. A cake support system of claim 7 wherein the shaft and tube are made or a material able to withstand the temperature of a commercial dishwasher.

11. A cake support system of claim 7 wherein the tube of each cake support has two projections on opposing sides of the interior of the tube.

12. A cake support system of claim 7 wherein the shaft of each cake support is solid.

* * * * *